Jan. 15, 1924.  
V. TIFFIN  
1,480,871  
CHILD'S VEHICLE  
Filed Dec. 13, 1921   2 Sheets-Sheet 1

INVENTOR  
Vandevere Tiffin  
BY  
Fred. C Matheny  
ATTORNEY

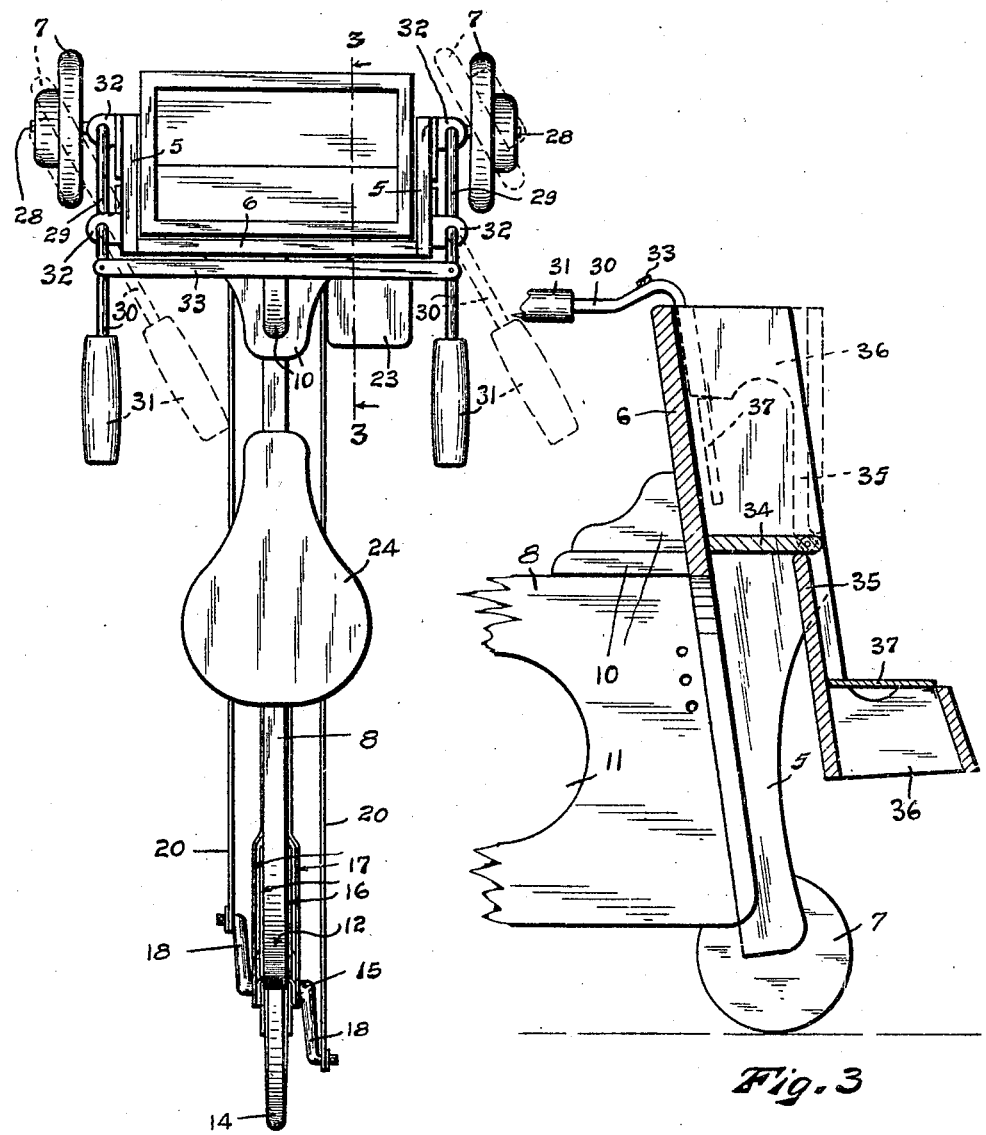

Patented Jan. 15, 1924.

1,480,871

UNITED STATES PATENT OFFICE.

VANDEVERE TIFFIN, OF TACOMA, WASHINGTON, ASSIGNOR OF NINETEEN-TWEN-TIETHS TO FRANK KELBLE AND ONE-TWENTIETH TO JOHN G. LUHRMAN, BOTH OF SEATTLE, WASHINGTON.

CHILD'S VEHICLE.

Application filed December 13, 1921. Serial No. 522,037.

*To all whom it may concern:*

Be it known that I, VANDEVERE TIFFIN, a citizen of the United States, residing at Tacoma, in the county of Pierce and State of Washington, have invented a certain new and useful Improvement in Children's Vehicles, of which the following is a specification.

This invention relates to improvements in toy vehicles for children and the object of this invention is to provide a child's vehicle in the nature of a tricycle car of novel construction that is attractive in appearance and interesting in its method of operation and that will afford great amusement to children and encourage them to take beneficial exercise.

Another object is to provide a child's vehicle or car of this nature having two wheels in front and one wheel at the rear and having means connected with the rear wheel and arranged to be operated by the feet of the rider from near the front of the vehicle for propelling said vehicle.

Another object is to provide a vehicle of this nature having two front wheels and having simple and efficient steering means connected with the front wheels, said steering means being arranged to be operated by one or both hands and being further arranged so that it will swing both wheels simultaneously in the same direction and through the same angle.

A further object is to provide on the front of the vehicle a convertible device of novel construction that will form a seat for a doll when it is open or lowered and that will form a box or receptacle wherein toys may be placed when it is closed or folded, the front of the vehicle being relatively wide, thereby affording ample room for the combined doll's seat and toy receptacle.

A still further object is to provide a vehicle of this nature that may be conveniently mounted from the rear and one whereon the pedals and the seat are both adjustable to suit children of different size.

Other and more specific objects will be apparent from the following description taken in connection with the accompanying drawings.

In the drawings Figure 1 is a view in side elevation of a child's vehicle or car constructed in accordance with this invention.

Fig. 2 is a plan view of the same.

Fig. 3 is a fragmentary sectional view substantially on a broken line 3, 3 of Fig. 2 showing, by full lines, certain devices on the front end of the car lowered to form a seat, as for a child's doll, and by broken lines the same devices in a raised or folded position to form a receptacle or box that may be used for the reception of small articles, as toys or playthings.

Like reference numerals designate like parts throughout the several views.

Figure 1:
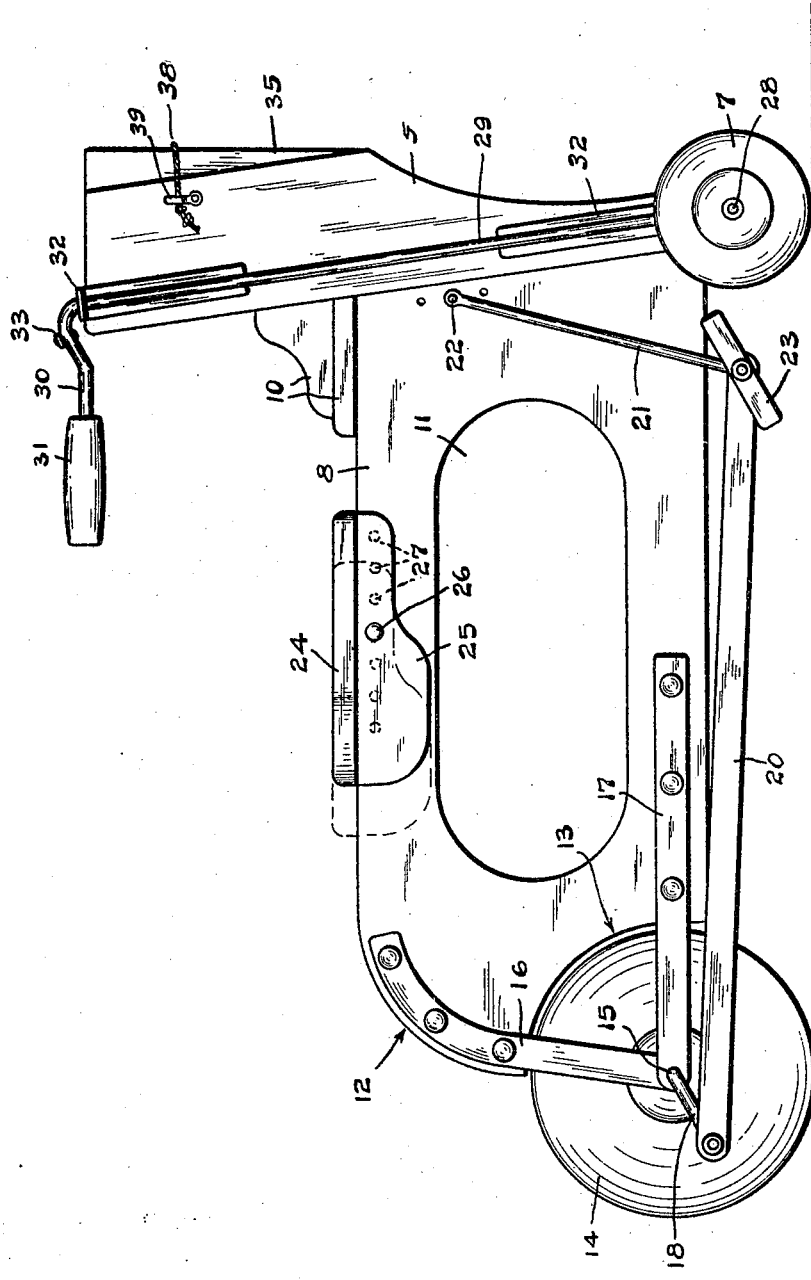

Referring to the drawings the frame of the vehicle is composed of an upright front frame portion preferably formed of two side members 5 that are rigidly supported in spaced apart parallel relation by a relatively wide flat front member 6, said side members 5 being secured to the edges of the front member 6 and extending forwardly therefrom in such a manner as to form a channel shaped structure with a normally open front side at the front of the vehicle and said side members also extending downwardly to form supports to the lower ends of which, small front wheels 7 may be attached.

The front frame portion comprising the parts 5 and 6 is normally inclined slightly to the rear from bottom to top thereof and is arranged to have a body portion 8 secured thereto said body portion preferably being formed of a piece of plank arranged in a vertical plane and at right angles to the plane of the front portion 6 and rigidly secured at the front end to the front portion 6 midway between the two side pieces 5, bracket members 10 preferably being used to form a rigid connection between the front member 6 and the body member 8.

The central portion of the body member 8 is preferably cut away as at 11 and the rear end of such body member is rounded on its upper edge on convex lines as at 12 and is cut away at its lower edge on concave lines as at 13 to form a recess for the reception of a rear wheel 14 that is rigidly secured to a crank shaft 15 which is journaled in brackets 16 and 17 that are secured to opposite sides of the body 8, said crank shaft terminating in oppositely arranged cranks 18 that are pivotally secured to the rear ends of connecting bars 20 whose forward ends are pivotally secured to the lower ends of links 21 that have their upper ends articulated by a pivot 22 with the body member 8. The lower ends of the links 21 have pedals 23 secured thereto by which the vehicle may be propelled, the pedals being arranged to be raised and lowered to suit children of different size by adjusting the links 21 vertically by means of a plurality of holes arranged one above another in the body member 8.

24 is a seat or saddle having on its bottom side two downwardly projecting spaced apart flanges 25 that are arranged to fit over the edge of the body member 8 as shown so that the saddle may be moved lengthwise along the top edge of the body member. If desired the saddle 24 may be adjustably secured to the body member 8, as by a pin or bolt 26 that may pass through holes 27 in the body member.

The smaller front wheels 7 are rotatably mounted on the outwardly turned ends 28 of steering rods 29 that extend upwardly along the side members 5 and are bent rearwardly at their upper ends to form handle bars 30 that terminate in grips 31. The steering rods 29 are rotatably secured to the side members 5 by clips 32 and the bars 30 are connected with each other by a transverse link 33 that has its opposite ends pivoted to the respective handle bars 30, as shown, so that the two front wheels will always be held parallel with each other regardless of the angle at which they are turned.

Extending crosswise between the side members 5 near the lower edge of the front member 6 is a horizontal plate 34 to the front edge of which is hinged a normally vertical member 35 of sufficient width to fit with slight clearance between the side members 5. The member 35 terminates at its outer end in a rectangular box like portion 36 to the outermost side of which is hinged a foot board 37 that rests against the member 35 when the latter is lowered as shown by full lines in Fig. 3 and that hangs down in an out of the way position when the member 35 is raised into the position shown by broken lines in Fig. 3.

The devices described in the preceding paragraph form a novel and interesting part of the toy. When the member 35 is lowered into the position shown by full lines in Fig. 3 the plate 34 forms a seat, the hinged member 37 forms a foot rest and the side members 5 form side arms of a chair on which a doll may be placed. When the member 35 is turned upwardly into the position shown in Figs. 1 and 2 which is the position shown by broken lines in Fig. 3 the foot rest 37 drops down thereby leaving a box or receptacle of which the member 6 forms the rear wall, the member 35 forms the front wall, the members 5 form the side walls and the plate 34 forms the bottom.

If desired a cord or light cable 38 may be made fast to one of the side members 5 so that it may be drawn across the front of the vehicle and engaged beneath a clip 39 on the opposite side member 5 to prevent a toy as a doll or teddy bear from falling off of the seat 34.

When the member 35 is in the raised or folded position it cooperates with other parts to form a receptacle that is especially well adapted to receive toys and small articles that a child may wish to put into it.

In riding the car the child may sit astride of the saddle 24 with hands grasping the handle bars 30 and feet on the pedals 23 and by pushing forward and downward on the pedals may propel the car easily and rapidly without touching the feet to the ground.

The car may also be propelled by the child by direct application of the feet to the ground in the manner common to vehicles of this nature, the pedals 23 being far enough forward so that they will not interfere with the feet when the car is propelled in this way. If desired the propelling devices may be entirely dispensed with and this car may be propelled by the rider by direct application of the feet to the surface over which the car is being moved as hereinbefore described.

The two front wheels 7 are far enough apart to give the vehicle stability and obviate all danger of it being easily tipped over and the direct and simple steering means by which the front wheels are connected together for parallel motion make the vehicle easy to steer either with one or both hands and have a tendency to hold the vehicle in a straight course unless it is voluntarily turned as by swinging the handle bars into a position as shown by broken lines in Fig. 2.

The narrow body member 8 and the presence of only one wheel at the rear makes it possible for a child to mount this vehicle easily from the rear instead of swinging the foot over the same from the side as is usually required in vehicles of this class that have two rear wheels.

This vehicle is strong and substantial in construction, efficient in operation, entertaining for children to play with, and not expensive to manufacture.

It may be made in various sizes to serve as a toy or plaything for smaller children and as both a plaything and an article of utility for larger children.

The foregoing description together with the accompanying drawings clearly illustrates the plan of construction and method of operation of this invention, but, while I have shown and described what I now consider to be the preferred embodiment of the invention it will be understood that the drawings are merely illustrative and that such changes in form dimensions and arrangement of parts of the device may be resorted to as are within the scope of the following claims.

What I claim is:

1. In a vehicle of the class described, a frame having a relatively wide front frame portion, an upright steering rod pivotally mounted at each side of said front frame portion, outwardly bent trunnions at the bottom ends of said steering rods, wheels on said trunnions, rearwardly bent handle bars at the upper ends of said steering rods, a link connecting said two handle bars for holding said wheels in parallel relation, a body member rigidly secured to said front frame portion and extending rearwardly therefrom, a seat on said body member and a wheel at the rear end of said body member.

2. A vehicle of the class described including a frame having a relatively wide front frame portion, two wheels supporting said front frame portion, steering devices connected with said wheels, a thin flat body member secured to said front frame portion and extending rearwardly therefrom in a vertical plane, a saddle on said body member, a wheel mounted for rotation at the rear end of said body member, a crank shaft secured to said wheel, connecting bars secured to said crank shaft and extending forwardly along said body member, links pivotally connected with the forward ends of said connecting bars, pedals on the lower ends of said links and pivot means for adjustably connecting the upper ends of said links with said body member.

3. In a vehicle of the class described, a frame including a relatively wide front member, two side pieces secured to said front member and projecting forwardly and downwardly therefrom, apparatus hinged to said frame for selectively forming a box like receptacle or a seat at the front of said frame, a rearwardly extending body portion connected with the front portion of said frame, wheels on said frame, a seat on said frame and steering means connected with the front wheels.

4. The combination with a child's vehicle embodying a frame that is mounted on wheels and provided with a seat and with steering apparatus, of a relatively wide front member forming a part of said frame, two side pieces secured to said front member and projecting forwardly and downwardly therefrom and apparatus hinged to said frame and arranged to cooperate with said front member and said side pieces to selectively form at the front of said frame a seat or a box like receptacle.

5. The combination with a child's vehicle embodying a frame that is mounted on wheels and provided with a seat and with steering apparatus, of a relatively wide front member embodied in said frame, two side pieces secured to the edges of said front member and projecting forwardly and downwardly therefrom, a cross piece between said two side members in front of said front member, a swinging member hinged to the edge of said cross piece, a box like frame on the outer end of said swinging member, and a foot board hinged to said box like frame and arranged to hang vertically when said swinging member is raised into a folded position, said swinging member cooperating with said front member and said side pieces to form a seat when it is lowered and a box like receptacle when it is raised.

Seattle Wn., Nov. 22, 1921.

VANDEVERE TIFFIN.